United States Patent [19]

Lasser

[11] Patent Number: 4,538,273
[45] Date of Patent: Aug. 27, 1985

[54] DUAL INPUT WATCHDOG TIMER

[75] Inventor: George A. Lasser, Schaumburg, Ill.

[73] Assignee: Honeywell Inc., Minneapolis, Minn.

[21] Appl. No.: 441,005

[22] Filed: Nov. 12, 1982

[51] Int. Cl.³ .............................................. G06F 11/04
[52] U.S. Cl. ......................................... 371/62; 371/12
[58] Field of Search ....................... 371/66, 12, 21, 16, 371/62, 61, 20; 364/200, 900; 179/84 UF

[56] References Cited

U.S. PATENT DOCUMENTS

| | | | |
|---|---|---|---|
| 4,072,852 | 2/1978 | Hogan et al. | 371/12 |
| 4,090,239 | 5/1978 | Twibell et al. | 364/200 |
| 4,118,792 | 10/1978 | Struger et al. | 371/20 |
| 4,162,526 | 7/1979 | Gass et al. | 364/200 |
| 4,270,168 | 5/1981 | Murply et al. | 371/16 |
| 4,339,801 | 7/1982 | Hosaka et al. | 371/21 |
| 4,354,248 | 10/1982 | Conger et al. | 179/84 UF |

FOREIGN PATENT DOCUMENTS

| | | | |
|---|---|---|---|
| 2846890 | 5/1980 | Fed. Rep. of Germany | 371/21 |
| 0004848 | 1/1981 | Japan | 371/12 |

Primary Examiner—Michael R. Fleming
Attorney, Agent, or Firm—Trevor B. Joike

[57] ABSTRACT

A dual input watchdog timer for a processor having a dual input circuit with first and second inputs and an output, the first and second inputs receiving signals from different software modules of the processor and the output for supplying a reinitialization signal to the processor if the dual input circuit improperly receives the signals to its inputs within a predetermined amount of time.

9 Claims, 2 Drawing Figures

4,538,273

DUAL INPUT WATCHDOG TIMER

BACKGROUND OF THE INVENTION

The present invention relates to watchdog timers for processors, such as microprocessors, and, more particularly, to a dual input watchdog timer which can monitor two different software modules in the processor so that a failure in any software module will be detected and result in reset or reinitialization of the processor.

The watchdog timing function in microprocessor applications, for example, is designed to monitor the microprocessor operation and to provide a reset or reinitialization signal to the microprocessor should a failure in the microprocessor occur. The watchdog timer in such a system usually receives periodic pulses from a software module in the microprocessor and is continuously reset by these periodic pulses. If a failure in the microprocessor should occur, the microprocessor no longer supplies these periodic pulses to the watchdog timer allowing the watchdog timer to supply an output pulse which is connected to the reset or reinitialization terminal of the microprocessor.

There is a failure mode which defeats this type of watchdog timing function. If the failure occurs such that the software module which generates the periodic pulses to the watchdog timer operates in a loop which excludes some or all of the other software modules, the watchdog timer assumes that the microprocessor is performing normally and will not generate the reset or reinitialization pulse. Copending patent application Ser. No. 308,703 discloses a system which monitors various points in the program memory to generate a serial data word to a cyclic redundancy checker. The cyclic redundancy checker is designed to require a periodic specific bit pattern which pattern is made up of bits selected from various locations in the program memory. In this way, a failure in a particular program memory location will not by itself defeat the watchdog timing function. However, the system shown in this copending application, while necessary in some applications, such as those where a failure can be hazardous, is overly complicated for other applications.

SUMMARY OF THE INVENTION

Therefore, the present invention is directed to a simple watchdog timer which monitors the correct operation of two software modules in order to provide the watchdog timing function. The system according to this invention includes a dual input circuit having first and second inputs and an output wherein the first and second inputs are connected to the processor such that the inputs receive signals from different software modules of the processor and wherein the output is responsive to the failure of at least one of the inputs to receive a signal for providing a reinitialization signal to the processor.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
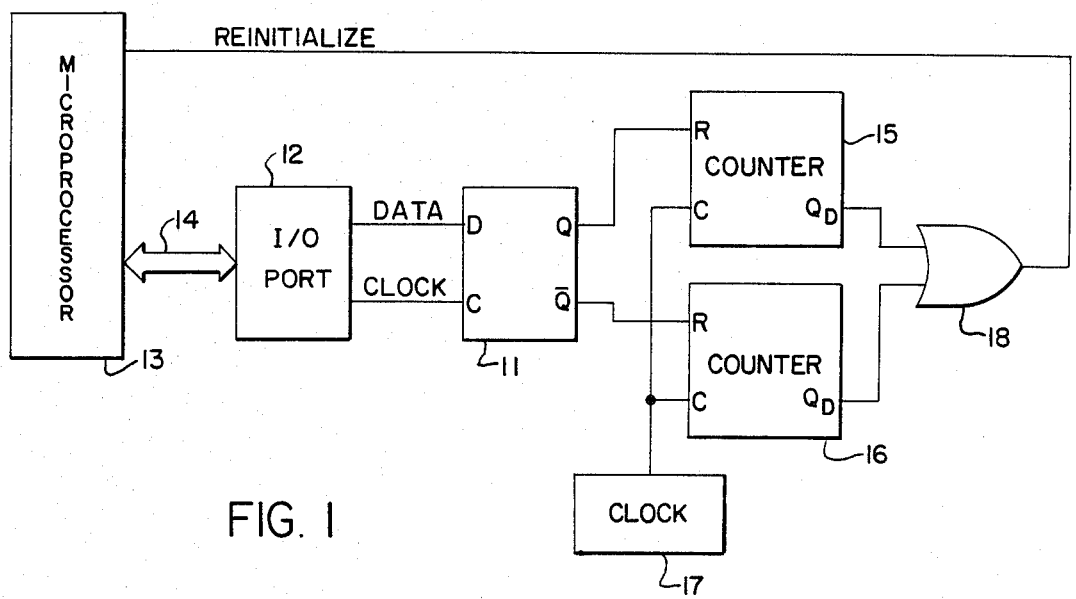
FIG. 1 is a circuit schematic of the invention.

In FIG. 1, the watchdog timing function is performed primarily by dual input device 11 which may be in the form of a D flip-flop. The data input terminal to the D flip-flop and the clock terminal to D flip-flop 11 are connected from corresponding outputs of input/output port 12 which communicates with microprocessor 13 over bus 14.

The Q output of flip-flop 11 is connected to the reset terminal of one counter 15 and the $\bar{Q}$ output of flip-flop 11 is connected to the reset terminal of another counter 16. The clock terminals of counters 15 and 16 are connected to clock source 17. The outputs of counters 15 and 16 are connected to inputs of OR gate 18 the output of which is connected to the reset or reinitialization terminal of microprocessor 13.

As an example of the types of circuits which can be used for the block shown in FIG. 1, the microprocessor may be an Intel 8086 processor, the input/output port 12 may be supplied under the standard industry part number 8255, flip-flop 11 may be supplied under the standard industry part number 74LS74, the counters may be supplied under the standard industry part number 74LS393, and OR gate 18 may be supplied under the standard industry part number 74LS32.

Figure 2:
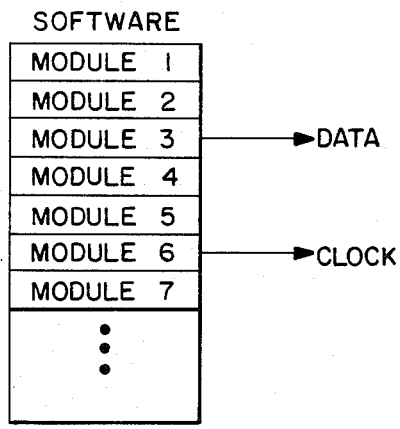
FIG. 2 shows the software used by the microprocessor of FIG. 1 and shows that the two inputs of the watchdog timer of FIG. 1 are supplied from different modules in the software.

In order to insure that the watchdog timing function of the circuit arrangement shown in FIG. 1 is responsive to more than one software module utilized by microprocessor 13, the data input terminal of flip-flop 11 is supplied through input/output port 12 by one module as shown in FIG. 2 and the clock terminal of flip-flop 11 is supplied through input/output port 12 from a different module of the software as shown in FIG. 2.

In operation, microprocessor 13 supplies a 1 to the D terminal of flip-flop 11 from module 3 in the example shown in FIG. 2 and then clocks the 1 at terminal D to output Q of flip-flop 11 by generating a clock pulse from module 6 in the example shown. The 1 at the output Q of flip-flop 11 resets counter 15. Next, microprocessor 13 supplies a 0 to the D input of flip-flop 11 and clocks the 0 through to the Q output and a 1 to the $\bar{Q}$ output which resets counter 16. Next, a 1 is supplied to the D input of flip-flop 11 and is clocked through to the Q output and so on. In this manner, counters 15 and 16 are alternately reset so that the outputs from counters 15 and 16 are maintained low and a reinitialization pulse is not supplied to microprocessor 13. However, if a system failure prevents module 3 or module 6 from executing the operation described above, either by failing to generate a proper signal, the proper sequence of signals, or as outlined above, one of the counters 15 and 16 will count clock pulses from clock 17 until an output is provided through OR gate 18 to reinitialize or reset microprocessor 13.

As can be seen, the watchdog timing function of FIG. 1 provides greater reliability that error functions in microprocessor 13 will be detected by the watchdog timer. An error which excludes either module 3 or module 6 from properly functioning will be detected.

The embodiments of the invention in which an exclusive property or right is claimed are defined as follows:

1. A dual input watchdog timer for processor means comprising:

dual input means having first and second inputs and having at least one output;

input connecting means for connecting said first and second inputs to a processor means such that said inputs receive signals from different software modules of said processor means; and, output connecting means responsive to said at least one output of said dual input means for providing a reinitialization signal to said processor if said dual input means improperly receives said signals to said inputs within a predetermined amount of time.

2. The dual input watchdog timer of claim 1 wherein said dual input means comprises a switch having said first and second inputs and said output means.

3. The dual input watchdog timer of claim 2 wherein said switch comprises a D flip-flop and wherein said first input is a D input to said D flip-flop and said second input is a clock input to said D flip-flop.

4. The dual input watchdog timer of claim 3 wherein said output connecting means comprises counter means having an input connected to said at least one output of said D flip-flop and a second input for receiving a clock input and having an output for providing said reinitialization signal when said counter means counts a predetermined number of pulses from said clock input before receiving an input from said D flip-flop.

5. The dual input watchdog timer of claim 4 wherein said at least one output comprises a non-inverted output and an inverted output and wherein said counter means comprises first and second counters, said first counter having a first input connected to said non-inverted output from said D flip-flop and said second counter having a first input connected to said inverted output from said D flip-flop, said first and second counters having second inputs connected to receive said clock pulses, each of said counters having an output.

6. The dual input watchdog timer of claim 5 wherein said counter means comprises an OR gate having a first input connected to the output of said first counter and a second input connected to the output of said second counter and having an output for supplying said reinitialization pulse to said processor means.

7. The dual input watchdog timer of claim 1 wherein said output connecting means comprises counter means having an input connected to said at least one output of said dual input means and a second input for receiving a clock input and having an output for providing said reinitialization signal when said counter means counts a predetermined number of pulses from said clock input before receiving an input from said dual input means.

8. The dual input watchdog timer of claim 7 wherein said at least one output comprises first and second outputs and wherein said counter means comprises first and second counters, said first counter having a first input connected to said first output from said dual input means and said second counter having a first input connected to said second output from said dual input means, said first and second counters having second inputs connected to receive said clock pulses, each of said counters having an output.

9. The dual input watchdog timer of claim 8 wherein said counter means comprises an OR gate having a first input connected to the output of said first counter and a second input connected to the output of said second counter and having an output for supplying said reinitialization pulse to said processor means.

* * * * *